(12) United States Patent
Zhou et al.

(10) Patent No.: US 10,900,940 B2
(45) Date of Patent: Jan. 26, 2021

(54) REFILLING-TYPE ONLINE CHROMATOGRAPHIC DETECTOR FOR SULPHUR HEXAFLUORIDE DECOMPOSITION PRODUCTS

(71) Applicant: ELECTRIC POWER RESEARCH INSTITUTE OF GUANGDONG POWER GRID CO., LTD., Guangdong (CN)

(72) Inventors: Yongyan Zhou, Guangdong (CN); Li Li, Guangdong (CN); Xiaopeng Fan, Guangdong (CN); Nian Tang, Guangdong (CN); Chengji Huang, Guangdong (CN); Xiaodian Li, Guangdong (CN); Jiawen Liu, Guangdong (CN); Peiqi Wu, Guangdong (CN)

(73) Assignee: ELECTRIC POWER RESEARCH INSTITUTE OF GUANGDONG POWER GIRD CO., LTD., Guangdong (CN)

( * ) Notice: Subject to any disclaimer, the term of this patent is extended or adjusted under 35 U.S.C. 154(b) by 139 days.

(21) Appl. No.: 16/088,813

(22) PCT Filed: Jun. 2, 2017

(86) PCT No.: PCT/CN2017/086904
§ 371 (c)(1),
(2) Date: Sep. 26, 2018

(87) PCT Pub. No.: WO2018/076694
PCT Pub. Date: May 3, 2018

(65) Prior Publication Data
US 2019/0107517 A1  Apr. 11, 2019

(30) Foreign Application Priority Data

Oct. 31, 2016 (CN) .......................... 2016 1 0965238
Oct. 31, 2016 (CN) ..................... 2016 2 1189268 U (51) Int. Cl.
*G01N 30/02* (2006.01)
*G01N 30/32* (2006.01)
(Continued)

(52) U.S. Cl.
CPC .......... *G01N 30/88* (2013.01); *B01D 53/025* (2013.01); *G01N 30/14* (2013.01); *G01N 30/32* (2013.01);
(Continued)

(58) Field of Classification Search
CPC ...... G01N 30/88; G01N 30/14; G01N 30/461; G01N 2030/8859; G01N 2030/8886;
(Continued)

(56) References Cited

U.S. PATENT DOCUMENTS 4,234,315 A * 11/1980 Scott ...................... G01N 30/12
422/78
5,501,981 A * 3/1996 Ray ...................... G01N 21/766
436/123

(Continued)

FOREIGN PATENT DOCUMENTS

| CN | 101059485 A | 10/2007 |
| CN | 102353737 A | 2/2012 |

(Continued)

OTHER PUBLICATIONS

International Search Report for PCT/CN2017/086904 dated Sep. 4, 2017, ISA/CN.

(Continued)

*Primary Examiner* — Brandi N Hopkins
(74) *Attorney, Agent, or Firm* — Yue (Robert) Xu; Apex Attorneys at Law, LLP (57) ABSTRACT

A backfilling-type online chromatographic detector for sulphur hexafluoride decomposition products includes: a compression pump, a vacuum pump, a gas storage tank, a first six-way valve, a second six-way valve, a first chromatographic column, a second chromatographic column and a detector. One end of the compression pump is connected to one end of the vacuum pump, another end of the vacuum pump is connected to one end of the gas storage tank, another end of the gas storage tank is connected to the first chromatographic column through the first six-way valve, the first chromatographic column is connected to the second chromatographic column through the second six-way valve, and the second chromatographic column is connected to the detector.

8 Claims, 3 Drawing Sheets

(51) Int. Cl.
  *G01N 30/88*  (2006.01)
  *B01D 53/02*  (2006.01)
  *G01N 30/14*  (2006.01)
  *G01N 30/46*  (2006.01)

(52) U.S. Cl.
  CPC ....... *G01N 30/461* (2013.01); *B01D 2256/18* (2013.01); *G01N 2030/025* (2013.01); *G01N 2030/328* (2013.01); *G01N 2030/8859* (2013.01); *G01N 2030/8886* (2013.01)

(58) Field of Classification Search
  CPC ............. G01N 30/32; G01N 2030/025; G01N 1/2202; G01N 21/3518; G01N 1/405; G01N 2030/324; G01N 21/51; G01N 2030/685; G01N 2030/328; G01N 21/766; G01N 31/12; G01N 33/2025; G01N 33/2835; G01N 30/68; G01N 33/0042; B01D 53/025; B01D 2256/18; Y10T 436/186; Y10T 436/188; Y10T 436/18

See application file for complete search history.

(56) References Cited

U.S. PATENT DOCUMENTS

| | | | |
|---|---|---|---|
| 2010/0116021 | A1* | 5/2010 | O'Brien ............... G01N 1/2202 73/23.37 |
| 2015/0129474 | A1 | 5/2015 | Bouvier et al. |

FOREIGN PATENT DOCUMENTS

| | | |
|---|---|---|
| CN | 202304897 U | 7/2012 |
| CN | 103472177 A | 12/2013 |
| CN | 104267132 A | 1/2015 |
| CN | 204389458 U | 6/2015 |
| CN | 105181856 A | 12/2015 |
| CN | 106370764 A | 2/2017 |
| JP | H0968522 A | 3/1997 |
| JP | H10311825 A | 11/1998 |
| WO | 2014008059 A1 | 1/2014 |

OTHER PUBLICATIONS

SIPO First Office Action corresponding to Application No. 201610965238.7; dated May 27, 2017.

* cited by examiner

REFILLING-TYPE ONLINE CHROMATOGRAPHIC DETECTOR FOR SULPHUR HEXAFLUORIDE DECOMPOSITION PRODUCTS

This application is the national phase of International Application No. PCT/CN2017/086904, titled "REFILLING-TYPE ONLINE CHROMATOGRAPHIC DETECTOR FOR SULPHUR HEXAFLUORIDE DECOMPOSITION PRODUCTS", filed on Jun. 2, 2017, which claims the priorities to Chinese Patent Application No. 201610965238.7, titled "BACKFILLING-TYPE ONLINE CHROMATOGRAPHIC DETECTOR FOR SULPHUR HEXAFLUORIDE DECOMPOSITION PRODUCTS", and Chinese Patent Application No. 201621189268.5, titled "BACKFILLING-TYPE ONLINE CHROMATOGRAPHIC DETECTOR FOR SULPHUR HEXAFLUORIDE DECOMPOSITION PRODUCTS", both filed with the State Intellectual Property Office of People's Republic of China on Oct. 31, 2016, which are incorporated herein by reference in their entireties.

FIELD

The present application relates to the field of electrical equipment testing, and more particularly to a backfilling-type online chromatographic detector for sulphur hexafluoride decomposition products.

BACKGROUND

With the rapid development of the power industry, the number of sulphur hexafluoride electrical equipment is continuously increasing. Under the factors of electric arc, spark discharge and high temperature and etc., sulfur hexafluoride is apt to be ionized and decomposed, and its decomposition products react with water and oxygen in the electrical equipment to generate acidic substances such as $SO_2$, $H_2S$ and HF, and extremely toxic and corrosive substances such as $SF_4$, $SOF_2$, $SF_2$ and $SO_2F_2$. Therefore, the detection of sulfur hexafluoride decomposition products, especially the detection of various decomposition products, is of great significance for judging the operating state, the cause of failure, the level of discharge, and the degree of danger of the electrical equipment.

The current detection methods for gas of sulfur hexafluoride electrical equipment mainly include an offline detection method and an online detection method, and the online detection method has received more and more attention due to its high timeliness. The on-line detectors currently used are mainly based on an electrochemical sensor detection method, and a detection probe is installed at a gas sampling hole of the sulfur hexafluoride electrical equipment, and can be used to detect the component of one to two characteristic gases.

However, since the sulphur hexafluoride electrical equipment generally has only one gas sampling hole, which may cause issues such that circulation between the gas in the gas sampling hole and the gas in the sulphur hexafluoride gas chamber is poor, and a dead volume is prone to be presented at the gas sampling hole, therefore, the issue of insufficient representativeness of sample often occurs. In addition, the detection of characteristic gases for sulfur hexafluoride currently include various gas components such as $SO_2$, $H_2S$, CO, $SO_2F_2$, $SOF_2$ and $CS_2$, however, the on-line detector based on electrochemical sensors can only detect two components at most, resulting in a low effectiveness of detection and a low practicability of the detector. In addition, the preliminary research of the project team shows that for the detection of characteristic gases of sulfur hexafluoride, the gas chromatograph has attracted more and more attention since it can detect multiple components of sulphur hexafluoride decomposition products, has a high detection precision and a low detection limit. Therefore, a technical issue to be addressed by the person skilled in the art is to develop an online chromatographic detector applicable to detection of the decomposition products of single-hole type sulfur hexafluoride electrical equipment.

SUMMARY

A backfilling-type online chromatographic detector for sulphur hexafluoride decomposition products is provided according to embodiments of the present application, which realizes automatic online detection and analysis for insulating gas of sulfur hexafluoride electrical equipment, and can detect multiple components, has a high detection precision, and can perform automatic sampling, detection and backfilling of sampling gas of the sulphur hexafluoride electrical equipment, and avoid harms to personnel and the environment caused by gas emission. Moreover, the backfilling of gas will not adversely affect the insulation of the electrical equipment, thereby significantly improving the frequency and timeliness of the online detection for sulphur hexafluoride.

A backfilling-type online chromatographic detector for sulphur hexafluoride decomposition products is provided according to an embodiment of the present application, which includes: a compression pump, a vacuum pump, a gas storage tank, a first six-way valve, a second six-way valve, a first chromatographic column, a second chromatographic column and a detector,

- one end of the compression pump is connected to one end of the vacuum pump,
- another end of the vacuum pump is connected to one end of the gas storage tank,
- another end of the gas storage tank is connected to the first chromatographic column through the first six-way valve,
- the first chromatographic column is connected to the second chromatographic column through the second six-way valve, and
- the second chromatographic column is connected to the detector.

Optionally, the backfilling-type online chromatographic detector for sulphur hexafluoride decomposition products according to an embodiment of the present application further includes: a sample loop, and

- a sample inlet end of the sample loop is connected to a sixth port of the first six-way valve, and a sample outlet end of the sample loop is connected to a third port of the first six-way valve.

Optionally, a second port of the first six-way valve is connected to a sample inlet end of the first chromatographic column, a sample outlet end of the first chromatographic column is connected to a first port of the second six-way valve, a second port of the second six-way valve is connected to a sample inlet end of the second chromatographic column, and a sample outlet end of the second chromatographic column is connected to the detector.

Optionally, the backfilling-type online chromatographic detector for sulphur hexafluoride decomposition products according to an embodiment of the present application further includes: a three-way valve and a gas purifier, and a first port of the first six-way valve is connected to a first port of the three-way valve, a second port of the three-way valve is connected to a sample outlet end of the gas purifier, and a third port of the three-way valve is connected to a third port of the second six-way valve.

Optionally, a sample inlet end of the gas purifier is connected to a carrier gas source, and a pressure-reducing valve is provided in a pipeline connecting the sample inlet end of the gas purifier to the carrier gas source.

Optionally, another end of the gas storage tank is connected to a fourth port of the first six-way valve, and a proportional valve is provided in a pipeline connecting the another end of the gas storage tank to the fourth port of the first six-way valve.

Optionally, a fifth port of the first six-way valve is connected to a gas chamber, and a switching valve and a proportional valve are provided in a pipeline connecting the fifth port of the first six-way valve to the gas chamber.

Optionally, the backfilling-type online chromatographic detector for sulphur hexafluoride decomposition products according to an embodiment of the present application further includes a pressure gauge, and the pressure gauge is connected to the gas storage tank.

Optionally, another end of the compression pump is connected to the fifth port of the first six-way valve, and a switching valve is provided in a pipeline connecting the another end of the compression pump to the fifth port of the first six-way valve.

Optionally, the fifth port of the first six-way valve is connected to an evacuating pipeline of the detector, and a switching valve is provided in the evacuating pipeline.

As can be seen from the above technical solutions, the embodiments of the present application have the following advantages.

Advanced detection technology: based on the principle of chromatographic detection, simultaneous online detection of total seven kinds of decomposition products including $SO_2$, $CF_4$, $SO_2F_2$, $SOF_2$, $H_2S$, $CS_2$, COS in sulphur hexafluoride electrical equipment can be realized, and the detection limits of each of the components is below 1 ppm, so the detection limit is low, and the detection precision is high.

Strong representativeness of detection: the present application is mainly to collect the gases in the sulfur hexafluoride electrical equipment for analysis and detection, which, compared with the existing fixed-type online detector, effectively addresses the issue of insufficient representativeness of gas sampling and significantly improves the effectiveness of online testing.

High security: according to the present application, the sample gas after being sampled and analyzed can be backfilled into the original sulfur hexafluoride equipment, thus effectively preventing the harms to the environment, equipment and personnel caused by sample gas emission; and moreover, the function of the backfilling does not adversely affect the insulation of the electrical equipment, which significantly improves the frequency and timeliness and practicability of the online detection for sulphur hexafluoride.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

REFERENCE NUMERALS IN FIG. 1 TO 7

| 1 | sulphur hexafluoride gas chamber, | 2 | standard gas chamber, |
|---|---|---|---|
| 3, 14 | proportional valve, | 4 | first six-way valve, |
| 5 | sample loop, | 6 | first chromatographic column, |
| 7 | second six-way valve, | 8 | second chromatographic column, |
| 9 | detector, | 10 | three-way valve, |
| 11 | gas purifier, | 12 | pressure-reducing valve, |
| 13 | carrier gas source, | 15 | gas storage tank, |
| 16 | pressure gauge, | 17 | vacuum pump, |
| 18 | compression pump, | V1-V4 | switching valve. |

DETAILED DESCRIPTION

A backfilling-type online chromatographic detector for sulphur hexafluoride decomposition products is provided according to embodiments of the present application, which realizes automatic online detection and analysis for insulating gas of sulfur hexafluoride electrical equipment, and can detect multiple components, has a high detection precision, and can perform automatic sampling, detection and backfilling of sampling gas of the sulphur hexafluoride electrical equipment, and avoid harms to personnel and the environment caused by gas emission. Moreover, the backfilling of the gas will not adversely affect the insulation of the electrical equipment, thereby significantly improving the frequency and timeliness of the online detection for sulphur hexafluoride.

In order to make the object, features and advantages of the present application more apparent and understandable, the technical solutions in the embodiments of the present application will be described clearly and completely hereinafter in conjunction with the drawings in the embodiments of the present application. Apparently, the embodiments described below are only a part of the embodiments of the present application, rather than all embodiments. Based on the embodiments in the present application, all of other embodiments, made by the person skilled in the art without any creative efforts, fall into the scope of protection of the present application.

Figure 1:
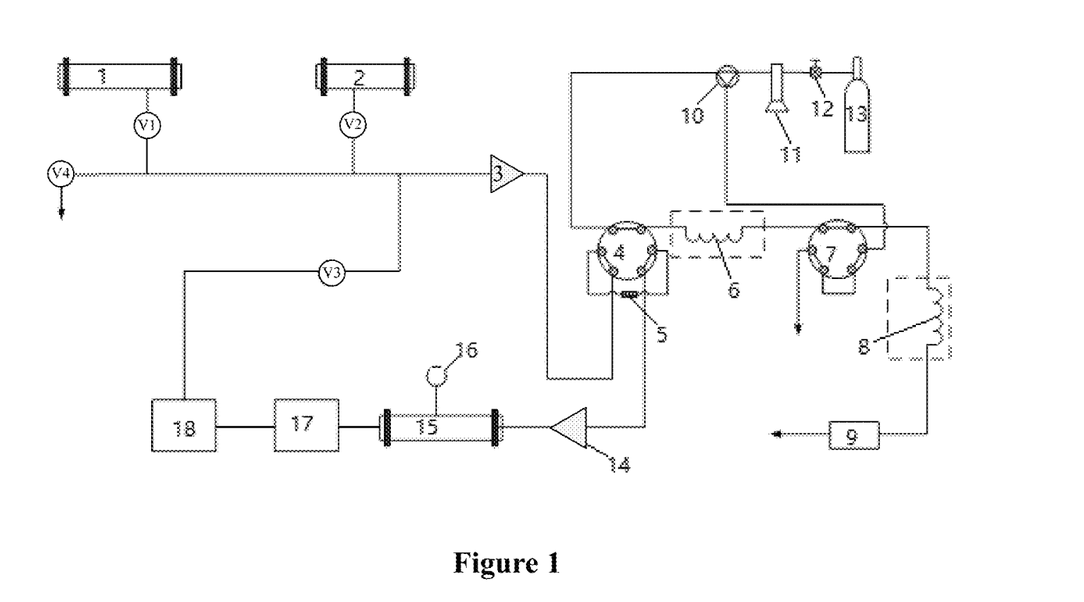
FIG. 1 is a schematic view showing the structure of a backfilling-type online chromatographic detector for sulphur hexafluoride decomposition products according to an embodiment of the present application.

Referring to FIG. 1, a backfilling-type online chromatographic detector for sulphur hexafluoride decomposition products according to an embodiment of the application includes: a compression pump 18, a vacuum pump 17, a gas storage tank 15, six-way valves 4 and 7, chromatographic columns 6 and column 8 and a detector 9. One end of the compression pump 18 is connected to one end of the vacuum pump 17. Another end of the vacuum pump 17 is connected to one end of the gas storage tank 15. Another end of the gas storage tank 15 is connected to the first chromatographic column 6 through the first six-way valve 4. The first chromatographic column 6 is connected to the second chromatographic column 8 through the second six-way valve 7. The second chromatographic column 8 is connected to the detector 9.

The backfilling-type online chromatographic detector for sulphur hexafluoride decomposition products according to an embodiment of the present application further includes a sample loop 5. A sample inlet end of the sample loop 5 is connected to a sixth port of the first six-way valve 4, and a sample outlet end of the sample loop 5 is connected to a third port of the first six-way valve 4.

A second port of the first six-way valve 4 is connected to a sample inlet end of the first chromatographic column 6, and a sample outlet end of the first chromatographic column 6 is connected to a first port of the second six-way valve 7. A second port of the second six-way valve 7 is connected to a sample inlet end of the second chromatographic column 8, and a sample outlet end of the second chromatographic column 8 is connected to the detector 9.

The backfilling-type online chromatographic detector for sulphur hexafluoride decomposition products according to an embodiment of the present application further includes a three-way valve 10 and a gas purifier 11.

A first port of the first six-way valve 4 is connected to a first port of the three-way valve 10, a second port of the three-way valve 10 is connected to a sample outlet end of the gas purifier 11, and a third port of the three-way valve 10 is connected to a third port of the second six-way valve 7.

A sample inlet end of the gas purifier 11 is connected to a carrier gas source 13, and a pressure-reducing valve 12 is provided in a pipeline connecting the sample inlet end of the gas purifier 11 to the carrier gas source 13.

Another end of the gas storage tank 15 is connected to a fourth port of the first six-way valve 4, and a proportional valve 14 is provided in a pipeline connecting this end of the gas storage tank 15 to the fourth port of the first six-way valve 4.

A fifth port of the first six-way valve 4 is connected to gas chambers, and switching valves V1 and V2 and a proportional valve 3 are provided in pipelines connecting the fifth port of the first six-way valve 4 to the gas chambers (the gas chambers include a sulphur hexafluoride gas chamber 1 and a standard gas chamber 2, and the standard gas chamber 2 is for online calibration of the chromatographic detector).

The backfilling-type online chromatographic detector for sulphur hexafluoride decomposition products according to an embodiment of the present application further includes a pressure gauge 16. The pressure gauge 16 is connected to the gas storage tank 15.

Another end of the compression pump 18 is connected to a fifth port of the first six-way valve 4, and a switching valve V3 is provided in a pipeline connecting this end of the compression pump 18 to the fifth port of the first six-way valve 4.

The fifth port of the first six-way valve 4 is connected to an evacuating pipeline of the detector, and a switching valve V4 is provided in the evacuating pipeline.

In this embodiment, the sampling system includes two sample inlet passages, multiple switching valves, two proportional valves 3 and 14, one sample loop 5 and one gas storage tank 15, which are mainly used for online sampling and backfilling of gas in the sulphur hexafluoride gas chamber 1 and the standard gas chamber 2. One of the two sample inlet passages is the sulphur hexafluoride gas chamber 1 to be detected, and the other one is the standard gas chamber 2, and the standard gas chamber 2 is mainly used to perform online calibration for the online chromatographic detector for sulphur hexafluoride, to ensure the accuracy of the detection by the chromatographic detector. The switching valves, the proportional valves and the like are mainly used for controlling the flow direction, flow speed and pressure of the sulphur hexafluoride, and the range of control of the proportional valve to the flow rate of the sulphur hexafluoride is from 50 ml/min to 200 ml/min. The main function of the six-way valves and the sample loop is to collect a certain quantity of sulphur hexafluoride, and also carry the certain quantity of sulphur hexafluoride into the chromatographic detection system. The sample loop 5 is a sulfur passivated stainless steel tube with a diameter of 1.5 mm, and the standard sampling volume is 5 ml. The gas storage tank 15 is a stainless pressure tank, and is mainly used to temporarily store the collected sulphur hexafluoride, to prevent impact to the environment caused by the random emission of the collected sulphur hexafluoride.

The vacuum pump 17, the compression pump 18 and the pressure gauge 16 constitute a vacuumizing and backfilling system, which has mainly two functions. One function is to discharge all gases from the detector to ensure that the gas entering the gas sampling pipeline is the gas in the targeted sulphur hexafluoride gas chamber, thereby ensuring the representativeness of the sampled gas. The second function is to backfill the gas in the sulphur hexafluoride sampling system and the gas storage tank 15 into the original sulfur hexafluoride gas chamber, to ensure the stability of the pressure of the sulphur hexafluoride gas chamber to be detected. The pressure gauge is configured to control the start and stop of the compressor and the vacuum pump. When the system performs the vacuumizing and backfilling functions, and when the pressure value in the gas circuit system reaches a predetermined value, the pressure gauge provides a signal to an automatic control system, and meanwhile, the automatic control system controls the start and stop of the compressor and the vacuum pump. The detection range of the pressure gauge is from 0 Mpa to 1.2 Mpa.

The chromatographic detection system mainly includes two LF-01 chromatographic columns 6, 8 (with a length 8 m, and an inner diameter 3 mm, and being filled with polar macromolecular resin), a PDD detector 9, a chromatographic heating tank, a gas purifier 11, and the six-way valve 4 and the six-way valve 7, and etc. The fourth port and the fifth port of the second six-way valve 7 are connected by a stainless steel tube, and the sixth port thereof is directly evacuated. The two LF-01 chromatographic columns are dedicated analytical columns for sulphur hexafluoride decomposition products, which can effectively separate multiple gas components such as $SO_2$, $SO_2F_2$, $SOF_2$, $H_2S$, $CF_4$ in sulfur hexafluoride sample gas. The chromatographic heating tank is mainly used to heat the two chromatographic columns to the required temperature, the temperature range is from room temperature to 200 degrees Celsius. The pipelines and valves and the like of the gas chromatograph are each made of a sulfur passivated stainless steel sampling tube with a diameter of 1.5 mm. A high quality metal-to-metal sealed 2/3 adapter with a stainless steel diaphragm is employed between the pipeline and each of the valves to prevent adsorption to the sample gas. The PDD detector 9 is a helium ion pulse detector, and the helium ion pulse detector is a pulsed discharge helium ionization detector for improving the detection sensitivity to the gas to be tested, and the valid detection limit thereof is at ppm level.

The gas chromatograph further includes an automatic control device, the automatic control device is a microcomputer or an instrument panel with a liquid crystal display, and can provide network remote management for the devices in the chromatograph, which facilitates remote monitoring and management of the instrument and data; and a negative control operation can be performed through the computer to the chromatograph.

The detection process of the sulphur hexafluoride decomposition products according to this embodiment includes initialization, vacuumization, sample collection, gas detection and analysis, gas switching analysis, sampler backfilling, and etc., and is described in detail as follows.

(1) Initialization

The initialization state is as shown in FIG. 1, the sulfur hexafluoride gas chamber 1 is connected to the detector, all the valves of the detector are closed, and the vacuum pump 17 and the compressor 18 are stopped, and the helium gas source (the carrier gas source 13) is turned on, and the flow rate thereof is adjusted to 100 ml/min, then the on-line detector for sulphur hexafluoride is turned on, and the working conditions of the chromatograph are set as the chromatographic column having a temperature of 60 degrees Celsius, and the detector having a temperature of 120 degrees Celsius. Helium gas, after flowing through the pressure reducing valve 12 and the gas purifier 11, flows via the first six-way valve 4 and the second six-way valve 7, respectively. The helium gas, flowing through the first six-way valve 4, passes through the first chromatographic column 6 and the second chromatographic column 8, to be detected, and it is observed whether the baseline of the chromatographic detector is stable.

(2) Vacuumization

Figure 2:
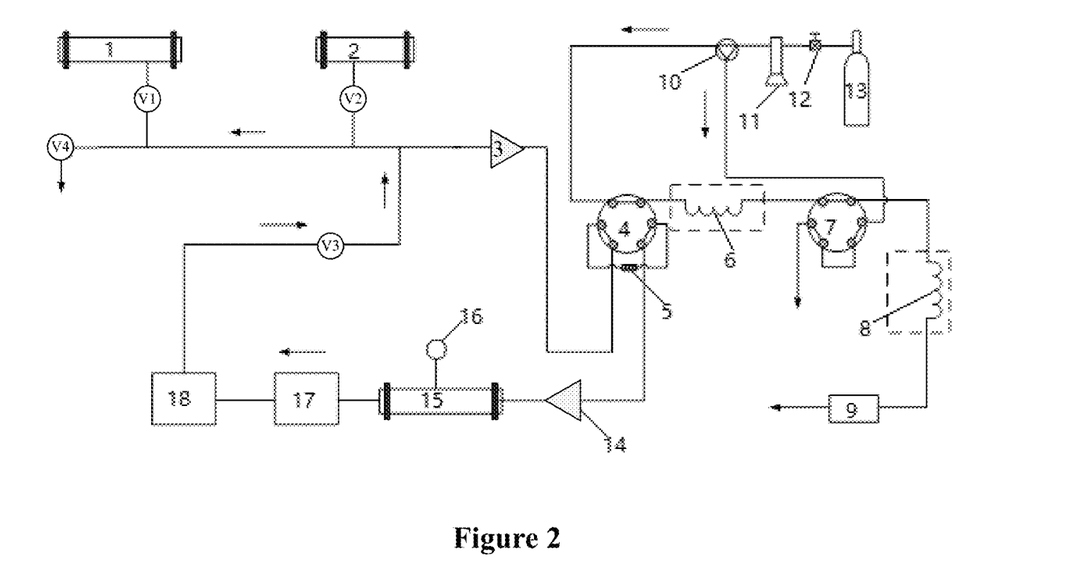
FIG. 2 is a schematic view showing a backfilling-type online chromatographic detector for sulphur hexafluoride decomposition products according to an embodiment of the present application in a vacuumizing state.

When the gas to be detected enters the detector, there may be air or other gases remained in the detector. Direct introducing gas not only adversely affects the accuracy of the detection data, but also pollutes the sulfur hexafluoride sample gas. Therefore, in order to remove residual gas in the sampling pipeline, it is necessary to vacuumize the gas in the original gas circuit part. The vacuumizing mode is set on the sulphur hexafluoride detection control panel, the pressure value of the pressure detection gauge 2 is set to 500 Pa, and the vacuumizing mode is started. The vacuumizing process is shown in FIG. 2, the valves V4 and V3 are opened, and the valves V1 and V2 and the proportional valves 3 and 14 are closed, and the vacuum pump 17 and the compression pump 18 are simultaneously started to discharge all of the gases in the gas storage tank 15, the pipeline and the valves of the sampling system. When the vacuum degree of the system reaches a predetermined requirement, the system returns to the initial state in FIG. 1 (which is automatically controlled by the pressure gauge 16 in the system).

(3) Sample Collection

Figure 3:
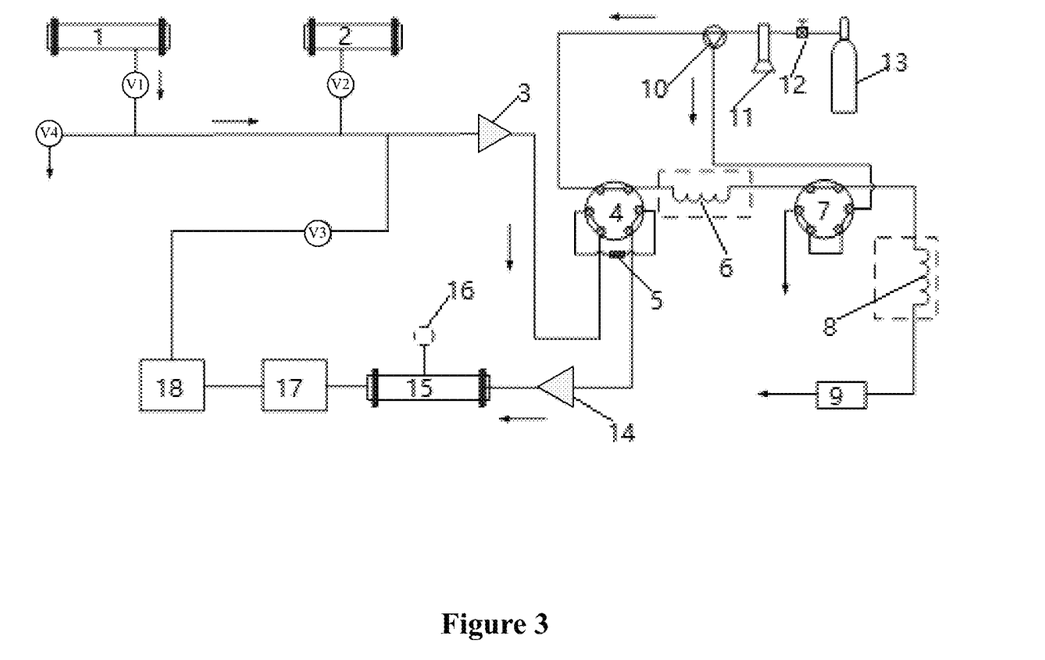
FIG. 3 is a schematic view showing a backfilling-type online chromatographic detector for sulphur hexafluoride decomposition products according to an embodiment of the present application in a sampling state.

The sampling process of the system for sampling the insulating gas of the sulphur hexafluoride electrical equipment is shown in FIG. 3. The gas sampling flow rate set on the sulphur hexafluoride detection control panel is 100 ml/min, and the sampling time is 10 min, the sampling start button is turned on, the valve V1 and the proportional valves 3 and 14 are opened, and the valves V2, V3 and V4 are closed, and the compression pump 18 and the vacuum pump 17 are stopped. The gas in the sulfur hexafluoride gas chamber 1 flows through the valve V1, the proportional valves 3 and 14 and the first six-way valve 4 and then enters the gas storage tank 15 to be stored. After the value of the pressure gauge 16 reaches a stable value, the system returns to the initial state (FIG. 1), and all the valves of the system are closed.

(4) Sample Detection and Analysis

Figure 5:
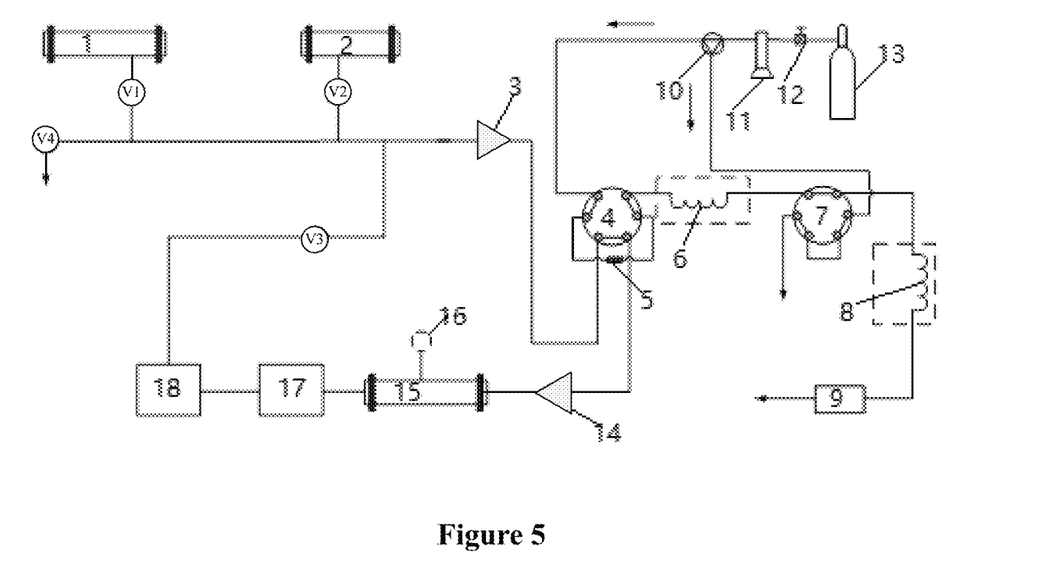
FIG. 5 is a schematic view showing a backfilling-type online chromatographic detector for sulphur hexafluoride decomposition products according to an embodiment of the present application in a sample analyzing state.

The sample detection mainly includes carrying the sulfur hexafluoride sample gas in the sample loop 5 into the chromatographic detection system, and the flow chart is shown in FIG. 5. Detection conditions are set on the chromatogram setting panel. Specifically, the chromatographic temperature is set as 60 degrees Celsius, the detector temperature is set as 120 degrees Celsius, the external events are set as 00, 0.20, 8.00, 14.00, 30.00 (respectively indicate that, beginning to start up, sampling, and the first six-way valve is switched to the state as shown in FIG. 5; after 0.2 minute, the first six-way valve is re-switched to the state shown in FIG. 1; after 8 minutes, the second six-way valve is switched to the state shown in FIG. 6; after 14 minutes, the second six-way valve is switched to the state shown in FIG. 1; and after 30 minutes, the sample analysis is completed, and the full spectrum diagram is output.)

When the detection is started, the first six-way valve 4 is switched to the mode in FIG. 5, the helium gas enters through the first port of the first six-way valve 4, and then carries the sulfur hexafluoride sample gas in the sample loop 5 to flow out from the second port of the first six-way valve 4 and then flows into the first chromatographic column 6. At this time, the valves and pumps in the sampling gas circuit are all in an off state. After all of the gas in the sample loop enters the first chromatographic column 6, the system returns to the initial state (FIG. 1). The helium gas as the carrier gas carrying the sulfur hexafluoride sample gas is separated by the first chromatographic column 6 and then is controlled by the second six-way valve 7 to enter the detector 9 for analysis.

After the detection is completed, according to the sample spectrum diagram, the concentration values of $SO_2$, $CF_4$, $SO_2F_2$, $SOF_2$, $H_2S$, $CS_2$, and COS are automatically calculated according to the peak heights of the sample.

(5) Gas Switching Analysis

Figure 6:
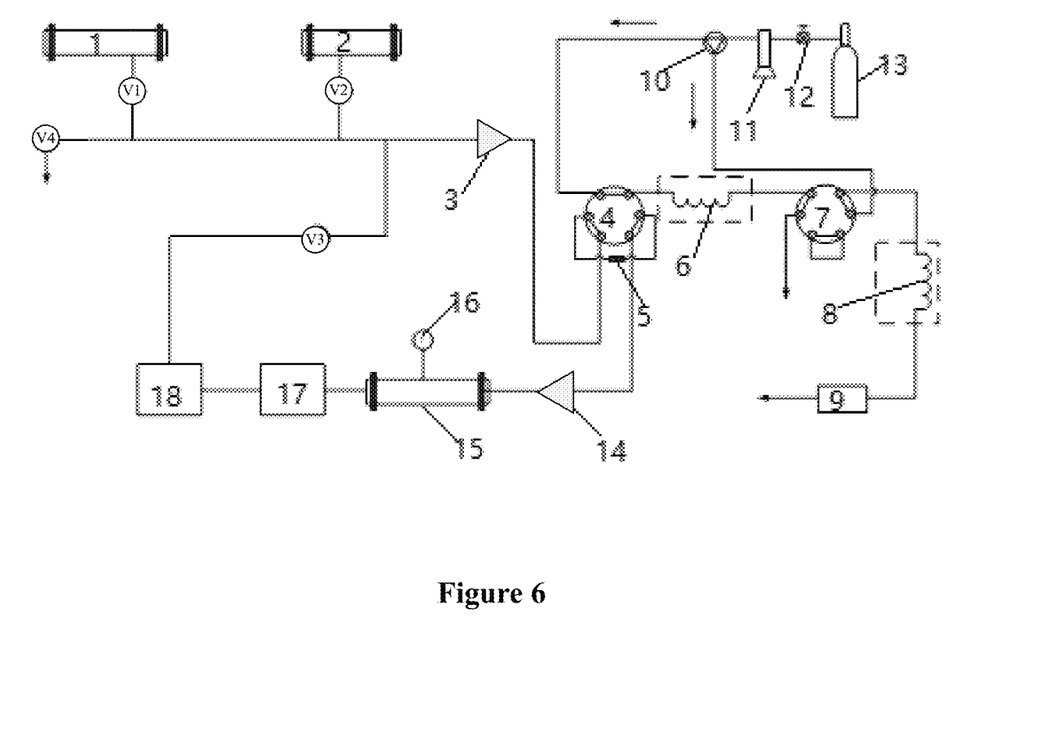
FIG. 6 is a schematic view showing a backfilling-type online chromatographic detector for sulphur hexafluoride decomposition products according to an embodiment of the present application in a sample switching analyzing state.

Since the sulfur hexafluoride sample gas is mainly for analyzing the characteristic gases under the background gas of sulfur hexafluoride, in order to achieve limited separation between the gas components, it is required to discharge all of the sulfur hexafluoride sample gas in the first chromatographic column 6, and when the gas analysis has been proceeded for 10 minutes, the gas switching analysis is performed, specifically as shown in FIG. 6. When to perform gas switching analysis, the state of the first six-way valve 4 is not changed, and the second six-way valve 7 performs the switching, the gas in the first chromatographic column 6 enters the first port of the second six-way valve 7, and is then discharged via the second port of the second six-way valve 7. After the gas switching has been performed for about 5 minutes, the state is re-switched to the state shown in FIG. 1, and at this time, the carrier gas carrying the gas in the first chromatographic column 6 enters the second chromatographic column 8, and is separated in the second chromatographic column 8, then the separated gas enters the detector 9 to be detected, till the gas detection is completed.

(6) Gas Backfilling

Figure 4:
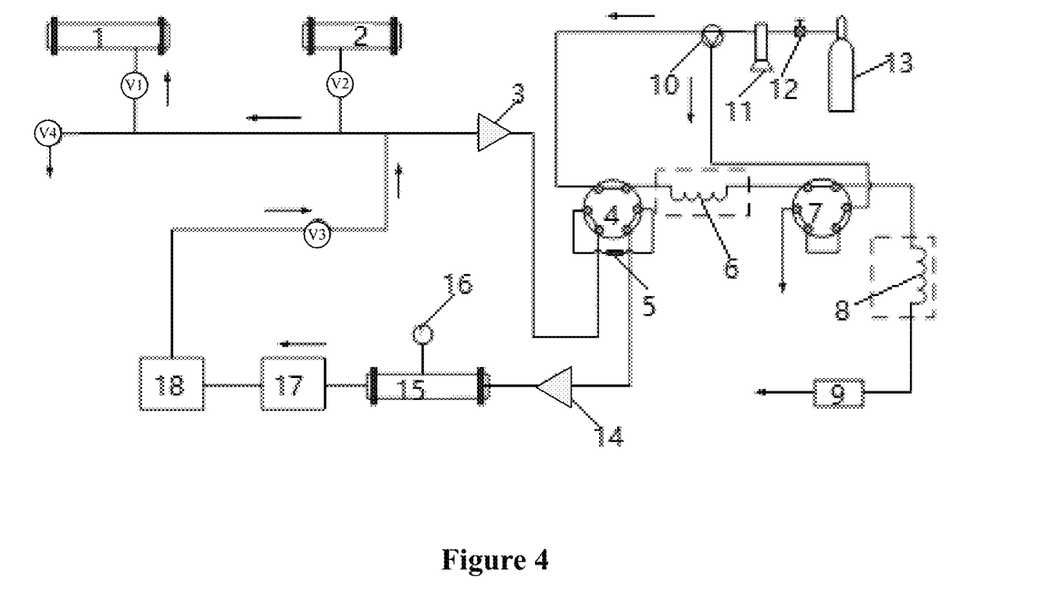
FIG. 4 is a schematic view showing a backfilling-type online chromatographic detector for sulphur hexafluoride decomposition products according to an embodiment of the present application in a gas backfilling state.

For preventing the collected sulphur hexafluoride gas from injuring the detection personnel and polluting the environment due to random emission, and also ensuring that the gas pressure in the original sulphur hexafluoride gas chamber 1 is stable, it is required to backfill the collected gas into the original sulphur hexafluoride gas chamber 1. The pressure value of the pressure gauge 2 is set as 500 pa, and the gas backfilling button is activated, the system has the gas automatically backfilled into the original sulphur hexafluoride gas chamber. The gas backfilling process is shown in FIG. 4, the valves V1 and V3 are opened, the valves V2 and V4 and the proportional valves 3 and 14 are closed, and the vacuum pump 17 and the compression pump 18 are started, to backfill the gas in the system into the original sulphur hexafluoride gas chamber 1, till the pressure of the detector reaches a constant value (the pressure gauge 16), at this time, the system is recovered to the initial state (FIG. 1), and the compression pump 18 is stopped.

In this embodiment, the specific indicators of the instrument are as follows:

Gas detection components: air, $CF_4$, $SO_2F_2$, $SOF_2$, $SO_2$ and $H_2S$ and other gases under the background gas of sulphur hexafluoride.

(1) The peak appearance time is as shown in Table 1:

TABLE 1

| Serial number | Decomposition products | Peak appearance time |
|---|---|---|
| 1 | air | 3.548 |
| 2 | $CF_4$ | 4.687 |
| 3 | $H_2S$ | 6.482 |
| 4 | $SF_6$ | 11.882 |
| 5 | $SOF_2$ | 16.464 |
| 6 | $SO_2F_2$ | 25.020 |
| 7 | $SO_2$ | 29.000 |

(2) Detection precision: each can reach the level of $10^{-6}$.
(3) Usage: outdoor continuous use.
(4) Sampling method: manual sampling and automatic sampling, specifically, the automatic sampling may be performed per hour, per day, per month and etc.
(5) The scope of sulphur hexafluoride electrical equipment to be detected: sulphur hexafluoride electrical equipment with a pressure ranging from 0.2 MPa to 0.7 MPa (absolute pressure).
(6) Vacuum index: the system can be vacuumized to 500 Pa (absolute pressure).
(7) range of flow rate in sampling: 0 L/min to 1 L/min.
(8) Chromatograph temperature control range: 20 degrees Celsius to 200 degrees Celsius.
(9) Gas backfilling rate: 99.99%.
(10) Rated voltage: 250 VAC.
(11) Rated frequency: 50.00±0.5 Hz.
(12) Weight: 10 kg.

The backfilling-type online chromatographic detector for sulphur hexafluoride decomposition products is provided according to the above embodiments, which realizes automatic online detection and analysis for insulating gas of sulfur hexafluoride electrical equipment, and can detect multiple components, has a high detection precision, and can perform automatic sampling, detection and backfilling of sampling gas of the sulphur hexafluoride electrical equipment, and prevent harms to personnel and the environment caused by gas emission. Moreover, the backfilling of gas may not adversely affect the insulation of the electrical equipment, thus significantly improving the frequency and timeliness of the online detection for sulphur hexafluoride.

The above embodiments are only intended for illustrating the technical solutions of the present application rather than limiting the present application. Although the present application has been described in detail with reference to the foregoing embodiments, the person skilled in the art should understand that the technical solutions described in the above embodiments can be modified, or equivalent substitutions can be made to part of the technical features; and these modifications or substitutions do not depart the essence of the corresponding technical solution from the spirit and scope of the technical solutions of the embodiments of the present application.

The invention claimed is:

1. A backfilling-type online chromatographic detector for sulphur hexafluoride decomposition products, comprising: a compression pump, a vacuum pump, a gas storage tank, a first six-way valve, a second six-way valve, a first chromatographic column, a second chromatographic column and a detector, wherein
   one end of the compression pump is connected to one end of the vacuum pump,
   another end of the vacuum pump is connected to one end of the gas storage tank,
   another end of the gas storage tank is connected to the first chromatographic column through the first six-way valve,
   the first chromatographic column is connected to the second chromatographic column through the second six-way valve, and
   the second chromatographic column is connected to the detector; and
   wherein another end of the gas storage tank is connected to a fourth port of the first six-way valve, and a proportional valve is provided in a pipeline connecting the another end of the gas storage tank to the fourth port of the first six-way valve; and
   wherein a fifth port of the first six-way valve is connected to a gas chamber, and a switching valve and a proportional valve are provided in a pipeline connecting the fifth port of the first six-way valve to the gas chamber.

2. The backfilling-type online chromatographic detector for sulphur hexafluoride decomposition products according to claim 1, further comprising: a sample loop, wherein
   a sample inlet end of the sample loop is connected to a sixth port of the first six-way valve, and a sample outlet end of the sample loop is connected to a third port of the first six-way valve.

3. The backfilling-type online chromatographic detector for sulphur hexafluoride decomposition products according to claim 2, wherein a second port of the first six-way valve is connected to a sample inlet end of the first chromatographic column, a sample outlet end of the first chromatographic column is connected to a first port of the second six-way valve, a second port of the second six-way valve is connected to a sample inlet end of the second chromatographic column, and a sample outlet end of the second chromatographic column is connected to the detector.

4. The backfilling-type online chromatographic detector for sulphur hexafluoride decomposition products according to claim 3, further comprising: a three-way valve and a gas purifier, wherein a first port of the first six-way valve is connected to a first port of the three-way valve, a second port of the three-way valve is connected to a sample outlet end of the gas purifier, and a third port of the three-way valve is connected to a third port of the second six-way valve.

5. The backfilling-type online chromatographic detector for sulphur hexafluoride decomposition products according to claim 4, wherein a sample inlet end of the gas purifier is connected to a carrier gas source, and a pressure-reducing valve is provided in a pipeline connecting the sample inlet end of the gas purifier to the carrier gas source.

6. The backfilling-type online chromatographic detector for sulphur hexafluoride decomposition products according to claim 1, further comprising: a pressure gauge; wherein the pressure gauge is connected to the gas storage tank.

7. The backfilling-type online chromatographic detector for sulphur hexafluoride decomposition products according to claim 1, wherein another end of the compression pump is connected to the fifth port of the first six-way valve, and a switching valve is provided in a pipeline connecting the another end of the compression pump to the fifth port of the first six-way valve.

8. The backfilling-type online chromatographic detector for sulphur hexafluoride decomposition products according to claim 7, wherein the fifth port of the first six-way valve is connected to an evacuating pipeline of the detector, and a switching valve is provided in the evacuating pipeline.

\* \* \* \* \*